United States Patent [19]
Rohloff

[11] Patent Number: 5,081,555
[45] Date of Patent: Jan. 14, 1992

[54] INTERNAL TAPE CLEANING MECHANISM FOR A TAPE CASSETTE

[75] Inventor: Arno Rohloff, Los Altos, Calif.

[73] Assignee: Verbatim Corporation, Charlotte, N.C.

[21] Appl. No.: 433,068

[22] Filed: Nov. 6, 1989

[51] Int. Cl.$^5$ .......................... G11B 23/02; G11B 5/41
[52] U.S. Cl. ..................................... 360/132; 360/128; 15/DIG. 13
[58] Field of Search ........................ 360/132, 128, 132; 15/DIG. 12, DIG. 13

[56] References Cited

U.S. PATENT DOCUMENTS

| | | | |
|---|---|---|---|
| 1,176,483 | 3/1916 | Ormsby | 15/100 |
| 3,872,510 | 3/1975 | Childress, Jr. et al. | 360/137 |
| 4,149,207 | 4/1979 | Porter, Jr. et al. | 360/133 |
| 4,181,089 | 1/1980 | Sato | 360/132 |
| 4,405,096 | 9/1983 | Possl | 360/132 |
| 4,510,546 | 4/1985 | Asami et al. | 360/133 |
| 4,618,904 | 10/1986 | Manning | 360/132 |
| 4,642,721 | 2/1987 | Georgens et al. | 360/132 |
| 4,713,713 | 12/1987 | Lu | 15/DIG. 12 |
| 4,722,016 | 1/1988 | Shirako et al. | 360/132 |
| 4,984,119 | 1/1991 | Backlund et al. | 360/128 |

FOREIGN PATENT DOCUMENTS 56-11667  2/1981  Japan .................................. 360/132

Primary Examiner—Aristotelis Psitos
Assistant Examiner—Jefferson Evans
Attorney, Agent, or Firm—William C. Dixon, III; Greg T. Sueoka

[57] ABSTRACT

A magnetic tape cassette having a pair of spaced-apart reels rotatably mounted on a support wall. A length of tape has its opposite ends secured respectively to the two reels and its intermediate portion wound around the reels to form corresponding tape rolls whose diameters vary inversely as the tape is simultaneously unwound from one reel and wound onto the other. The two rolls have outer tape windings with recording surfaces thereon facing each other. Tape cleaning means is interposed between, and biased into contact with, the outer winding facing surfaces for continuously cleaning those surfaces as the tape is unwound from one reel and wound onto the other.

1 Claim, 6 Drawing Sheets

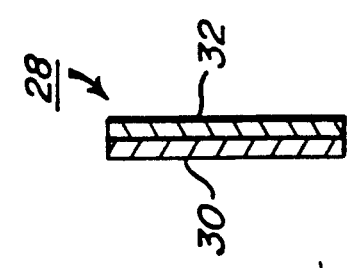
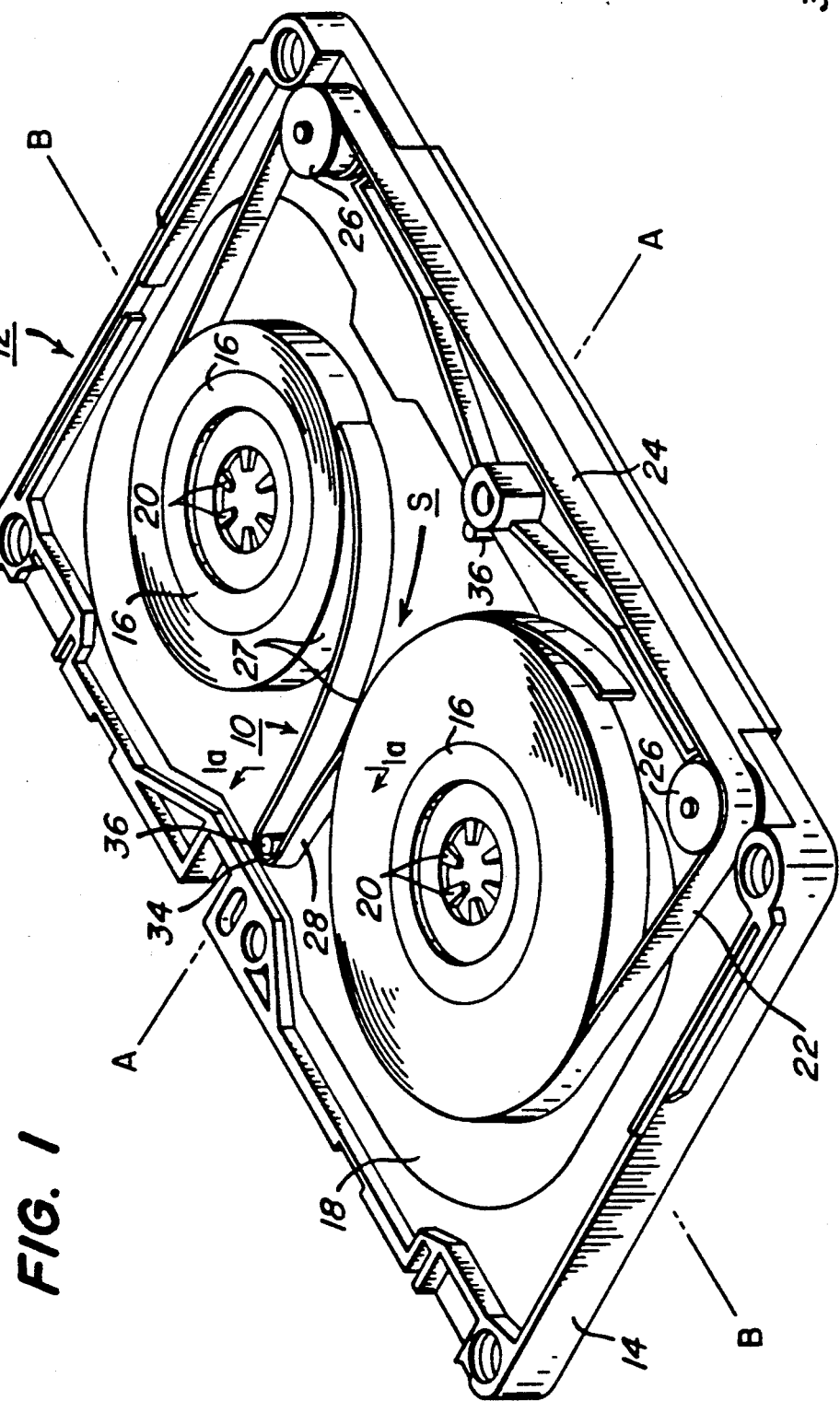

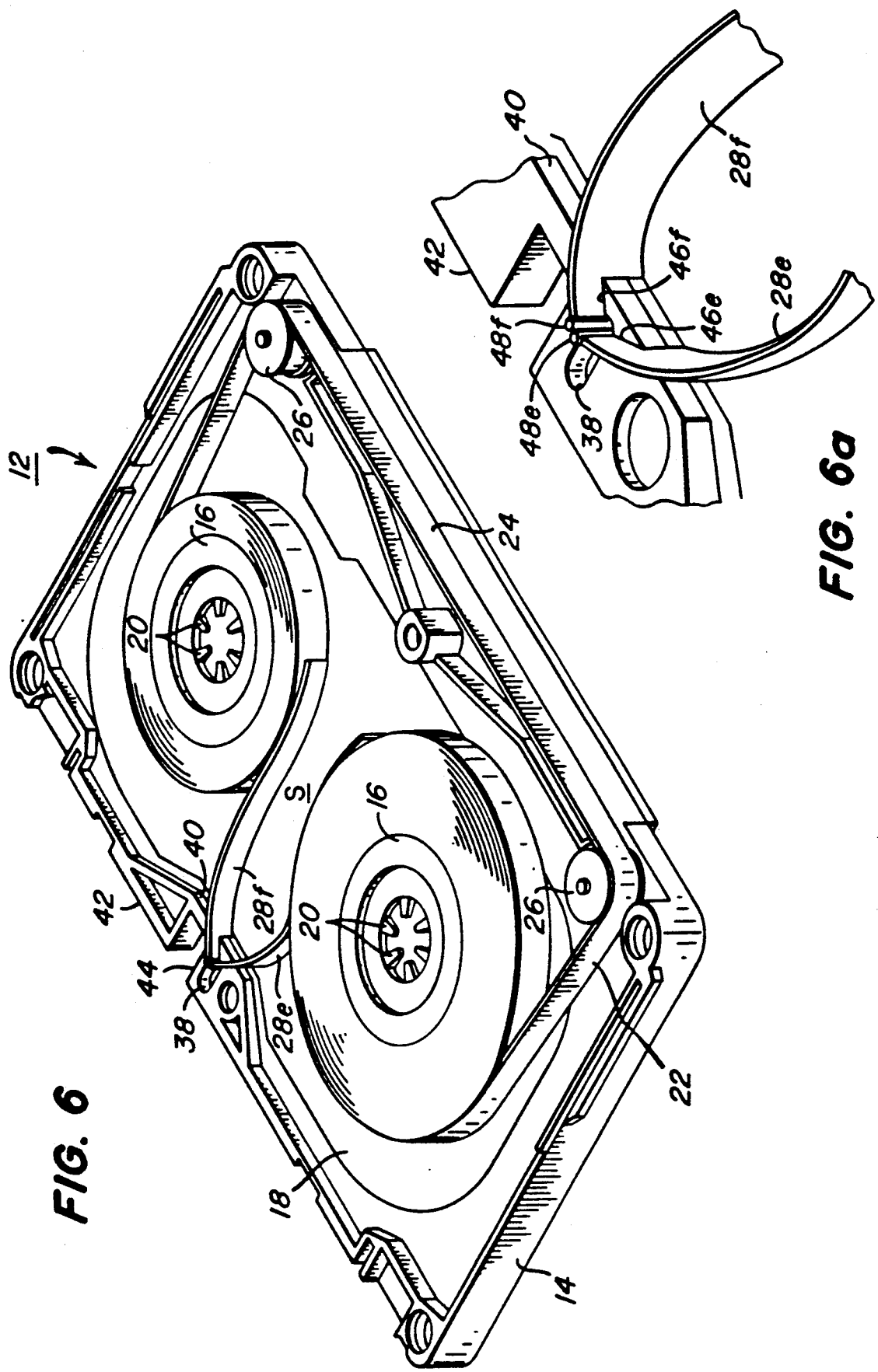

INTERNAL TAPE CLEANING MECHANISM FOR A TAPE CASSETTE

BACKGROUND OF THE INVENTION

1. Field of the Invention

This invention relates generally to tape cassettes, and particularly to tape cleaning means incorporated into such cassettes.

2. Description of the Prior Art

If recording or reproducing of data is performed in a magnetic tape cassette system, dust or other debris may invade the cassette and get onto the tape recording surface, thereby causing so-called soft errors, or dropout, to occur in the output signal. To prevent occurrence of such output-signal errors in magnetic disk systems, U.S. Pat. No. 4,149,207, issued Apr. 10, 1979 to Porter, Jr. et al., discloses a disk cleaning means for a disk cassette. The cleaning means in that patent comprises a flexible cleaning tab having a backing layer of Mylar (registered trademark of E. I. duPont de Nemours & Co.) film or the like covered by a porous fibrous paper cleaning layer. One end of the tab is mounted in a V-shaped rib on the cassette wall; the other end is biased into engagement with the disk face to clean it.

A disk cleaning means for a disk cassette also is disclosed in U.S. Pat. No. 4,510,546, issued Apr. 9, 1985 to Asami et al. The cleaning means there comprises a flexible pressure member interposed between a cleaning liner and a wall of the cassette for pressing a surface portion of the cleaning liner against the recording surface of the disk.

A device for cleaning motion-picture film is disclosed in U.S. Pat. No. 1,176,483, issued Mar. 21, 1916 to J. J. Ormsby. That device, for cleaning each film roll, comprises a pad of felt material secured to a cylindrically curved concave surface of a shoe, with a cleaning strip of fabric stretched across the arc of the shoe. The cleaning strip on each shoe is pressed into engagement with the outer winding of one of the film rolls, to clean the film as it is unwound from one roll and wound onto the other.

SUMMARY OF THE INVENTION

In accordance with a preferred embodiment of this invention, a tape cleaning means is disclosed for use in a tape cassette. The cassette has a pair of spaced-apart reels, or hubs, rotatably supported on a wall of the cassette. A length of tape has its opposite ends connected to the two reels, respectively, with an intermediate portion thereof guided through a recording and playback head. During recording or playback, the tape is wound around both reels to form corresponding tape rolls whose diameters vary inversely as the tape is unwound from one roll and wound onto the other. The two rolls have outer tape convolutions with recording surfaces thereon facing each other. The tape cleaning means of this invention is interposed between, and biased into contact with, the outer convolution facing surfaces so as to continuously clean those surfaces as the tape is simultaneously unwound from one roll and wound onto the other.

In more specific embodiments of this invention, the cleaning means comprises a continuous or non-continuous flexible strip having a tape surface contacting portion adapted to press against at least one of the outer winding facing surfaces. The flexible strip includes a backing layer of resilient material and a front layer of cleaning material facing the tape surface. In some embodiments, a portion of the flexible strip is mounted on a mounting member affixed to a wall of the cassette; and in at least one other embodiment, the flexible strip is freely floating, i.e., unattached to the cassette wall.

A primary object of this invention has been to provide tape cleaning means for a standard tape cassette, e.g., of the type utilized in audio and digital recording. Heretofore, no effective means has been provided to clean the recording surface of tape used in such a cassette. As speeds and densities have increased, the need for cleaning the tape has increased commensurately. That need has now been met by this invention, which provides effective cleaning means between the supply and take-up reels within the cassette. The cleaning means of this invention is of simple design and construction, thoroughly reliable and efficient in operation, and economical to manufacture.

This invention and its advantages will become more apparent from the detailed description of preferred and alternative embodiments thereof presented below.

BRIEF DESCRIPTION OF THE DRAWINGS

In the detailed description of the preferred and alternative embodiments of this invention presented below, reference is made to the accompanying drawings, wherein:

FIG. 1 is a perspective view of the preferred embodiment of this invention, showing the tape cleaning means thereof incorporated into a tape cassette, portions of which have been omitted for clarity of illustration;

FIG. 1a is a cross-sectional view of the cleaning means shown in FIG. 1, taken substantially along line 1a—1a of FIG. 1;

FIGS. 2–6 are perspective views similar to FIG. 1 but showing alternative embodiments of the tape cleaning means of this invention; and FIG. 6a is an enlarged fragmentary view of the tape cleaning means depicted in FIG. 6, showing a portion thereof broken away to reveal details of its construction.

DETAILED DESCRIPTION OF THE INVENTION

Figure 2:
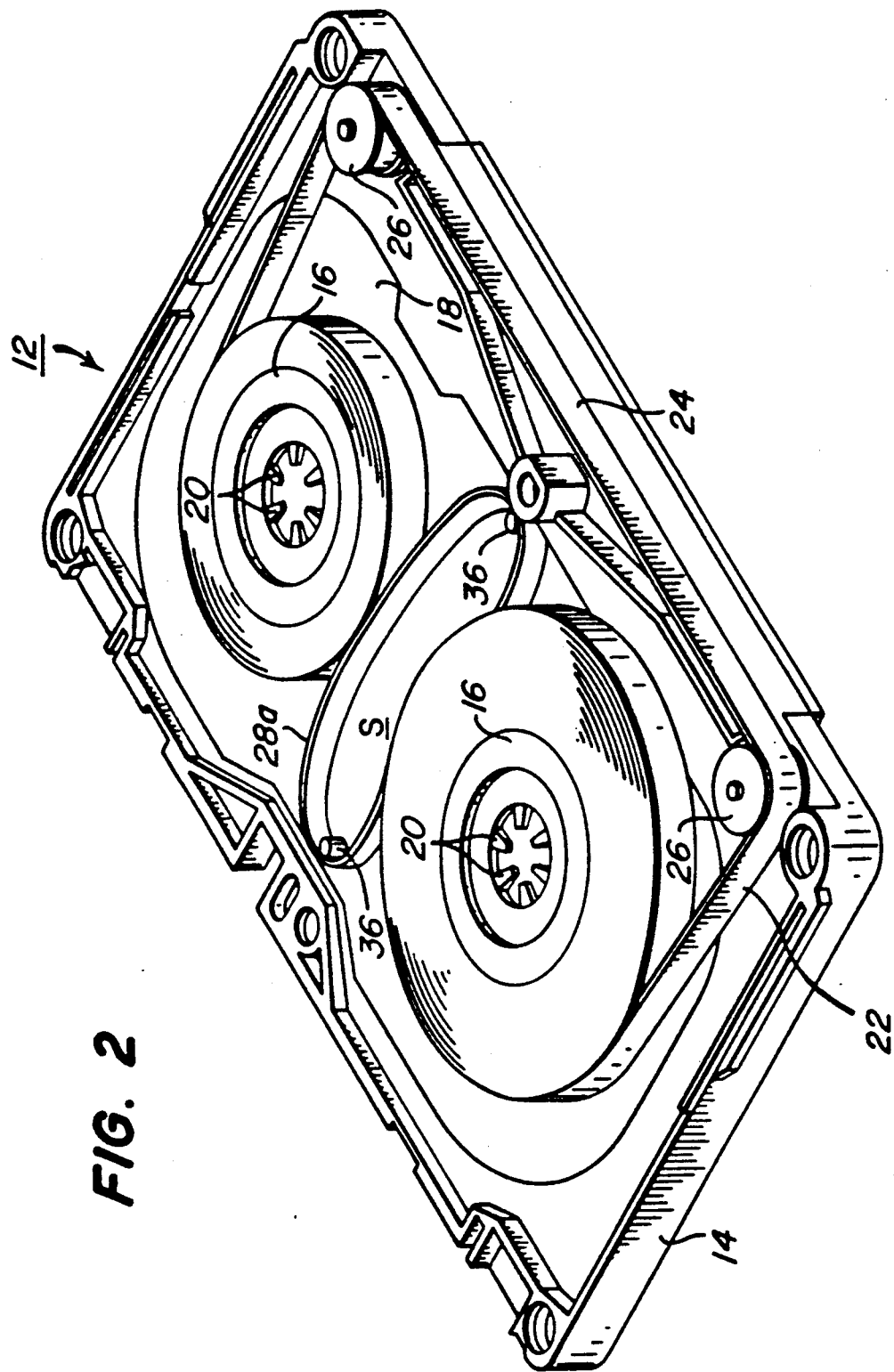

Because certain parts of tape cassettes and related apparatus are well known, the following description is directed in particular to those elements forming, cooperating directly with, or relating to, the present invention. Elements not specifically shown or described herein are selectable from those known in the pertinent art.

Referring now to FIG. 1, the tape cleaning means 10 of this invention is shown incorporated into a magnetic tape cassette 12. Tape cassette 12 is of the standard type having upper and lower mating halves 14 that are adapted, when joined together, to form an enclosure for a pair of spaced-apart annular hubs 16. (In FIG. 1, only the lower half is shown.) The upper and lower halves 14 have opposing top and bottom walls 18, respectively, that are provided with circular recesses, for nestably receiving the hubs 16, and circular openings in the recesses through which cooperating splined drive posts can extend into meshing engagement with radial ribs 20 on hubs 16, for rotatably driving the hubs when cassette 12 is operably mounted in associated tape recording or reproducing apparatus.

A length of tape 22 is provided with its opposite ends connected, by known means, to the two hubs 16. A central portion 24 of the tape is trained over a pair of spaced-apart guide rollers 26 so as to engage a capstan on the associated recording or reproducing apparatus when cassette 12 is operably mounted therein. The central portion 24 is further wound around the two hubs 16 so as to form corresponding tape rolls of inversely changing diameters as the tape is unwound from one roll and wound onto the other.

The two rolls have outer tape winding with recording surfaces 27 thereon facing each other between the two hubs. The facing surfaces 27 define a laterally moving space S therebetween, which varies from about 0.3 cm to about 0.6 cm during a complete unwinding of a full roll onto an empty hub. The space S moves laterally from one hub periphery to the other during winding and unwinding of the tape.

Tape cleaning means 10 is shown interposed between the two rolls in space S. As illustrated in FIG. 1a, the tape cleaning means comprises a flexible strip 28 having a backing layer 30 formed from any suitable resilient material, such as Teflon (registered trademark of E. I. duPont de Nemours & Co.) film. Affixed to backing layer 30, by adhesive or other means, is a front cleaning layer 32 that is contactable with the facing recording surfaces 27. Cleaning layer 32 may be made of a nonwoven fabric or porous fibrous paper. The flexible strip 28 is V-shaped and is secured at its apex 34 to one of a pair of upstanding posts 36 on bottom wall 18. The two posts 36 preferably lie on a bisecting line A—A that is perpendicular to, and bisects, an axial line B—B extending through the axes of hubs 16. The one post 36 to which strip 28 is secured is laterally offset from axial line B—B in one direction, while the other, similar post 36 is laterally offset from axial line B—B in the opposite direction.

Illustrated in FIG. 2 is an alternative embodiment of the invention similar to that shown in FIG. 1. In this embodiment, the flexible strip 28a is endless and encircles both posts 36.

Figure 3:
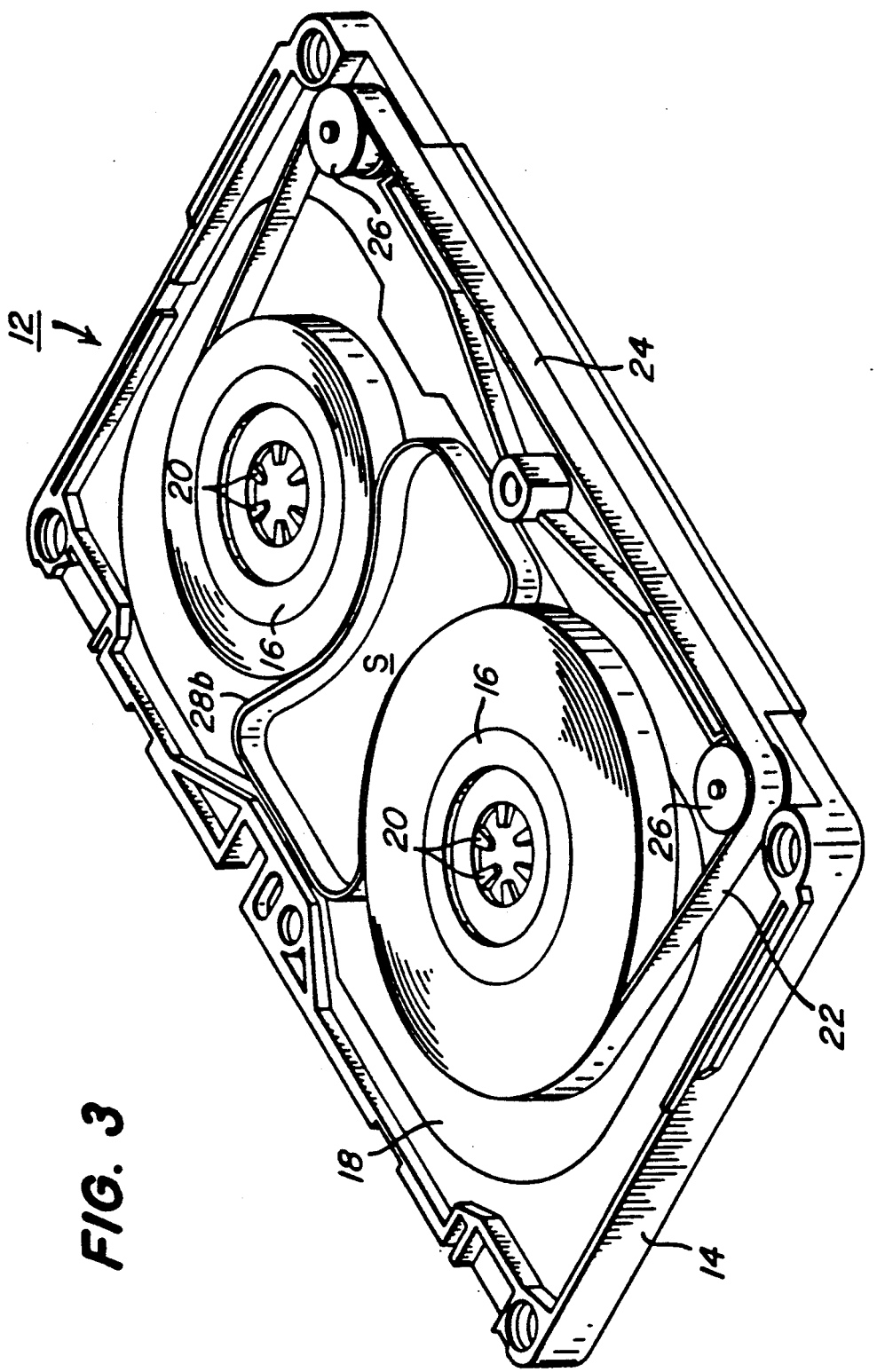

Illustrated in FIG. 3 is another embodiment of this invention wherein the posts 36 are omitted and the tape cleaning means comprises a floating endless flexible strip 28b having a permanent hour-glass shape, whose curved midportions are biased into continuous contact with the outer winding facing surfaces.

Figure 4:
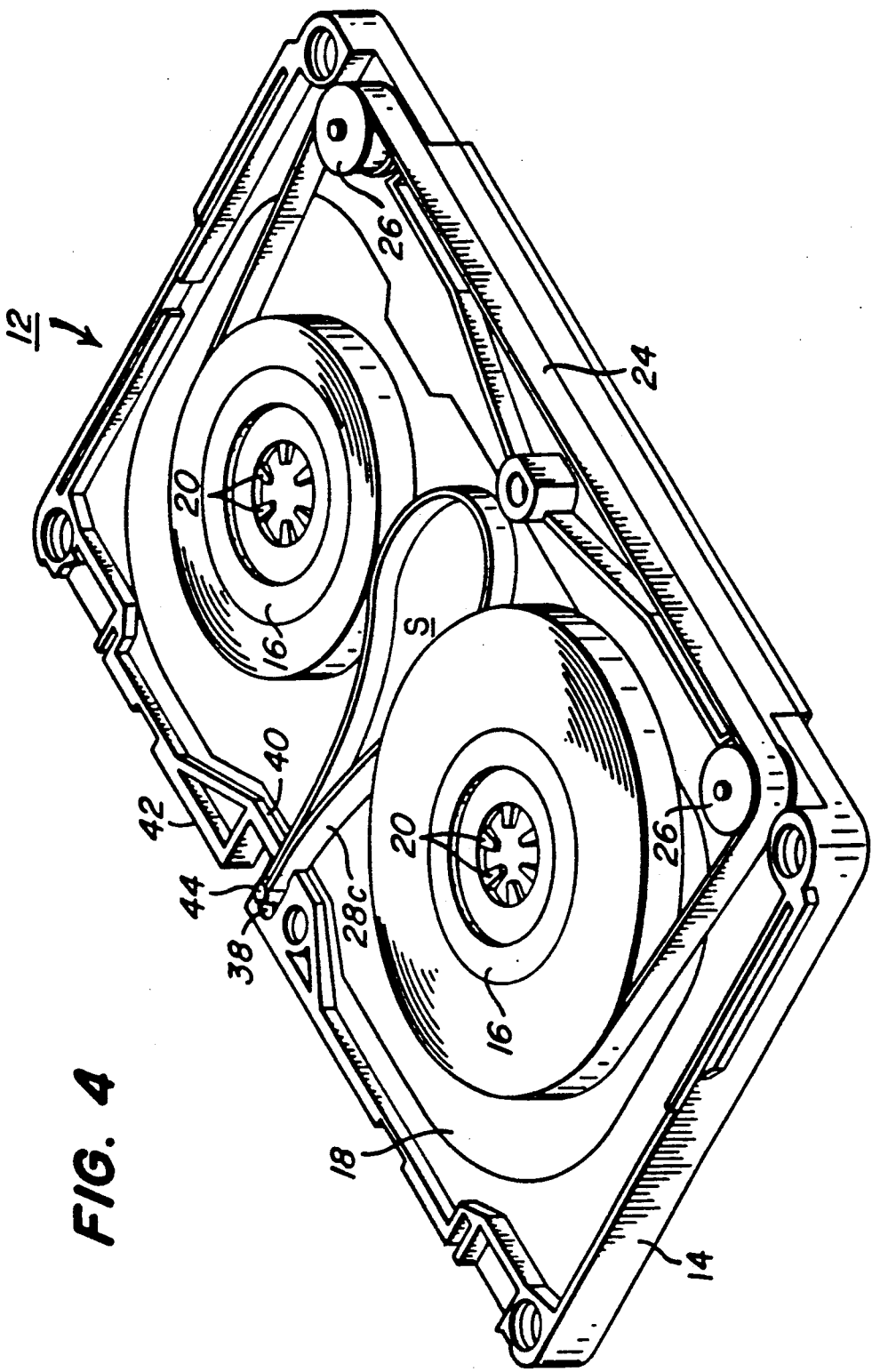

Illustrated in FIG. 4 is yet another embodiment of this invention wherein the means for mounting flexible strip 28c comprises a slot 38 located in an abutment 40 extending from one of the cassette walls, such as rear wall 42. The ends of flexible strip 28c are secured together by a pin 44 or the like which nests in slot 38.

Figure 5:
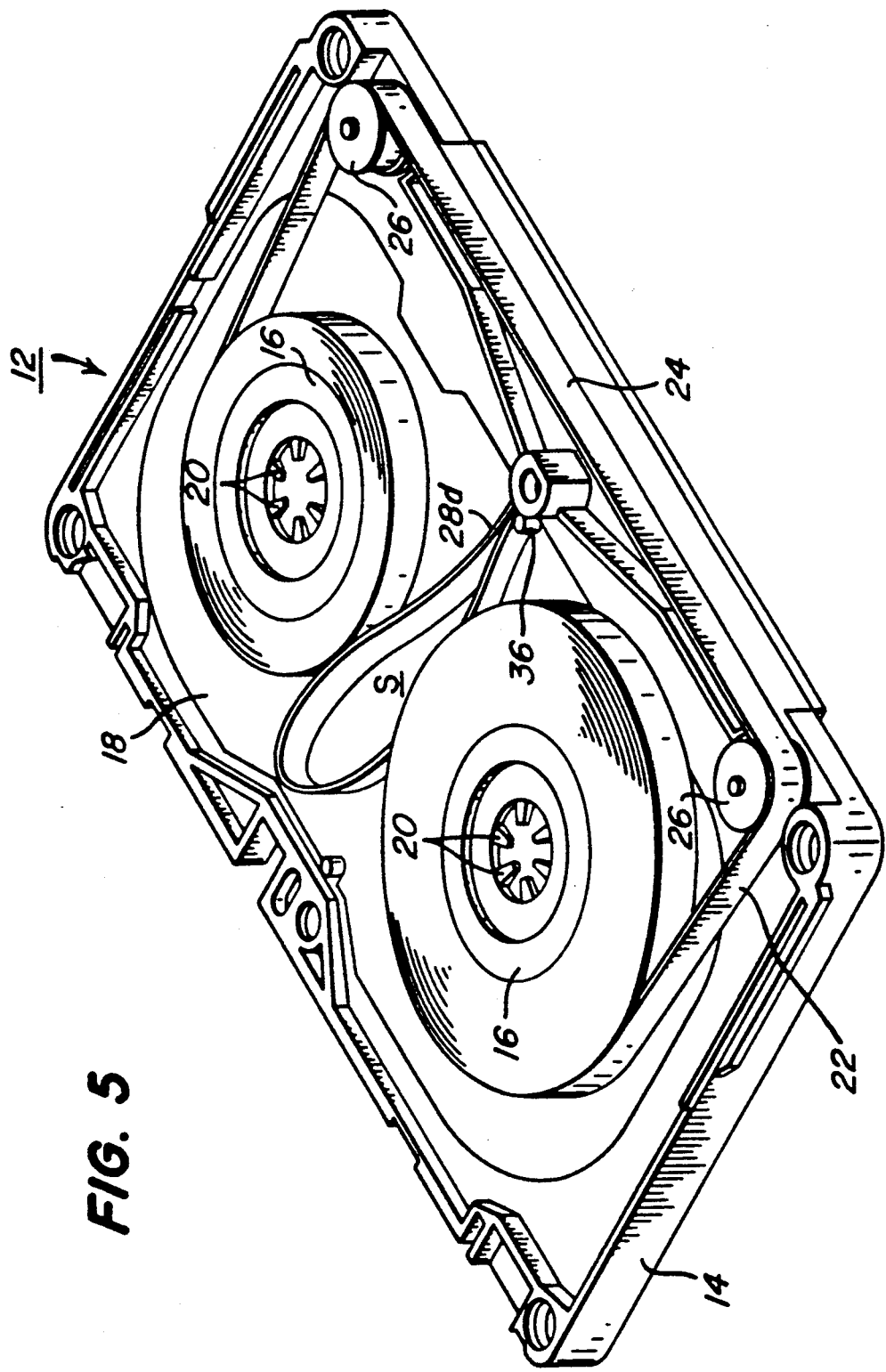

Illustrated in FIG. 5 is still another embodiment of the invention similar to that shown in FIG. 4, but in this embodiment the two ends of flexible strip 28d are secured to one of the posts 36.

Illustrated in FIG. 6 is a further embodiment of this invention wherein the strip mounting means comprises a pair of angled slots 46e, 46f, extending inwardly from slot 38 through abutment 40, for receiving converging ends of a mating pair of flexible strips 28e, 28f secured in place by pins 48e, 48f. The angled slots 46e, 46f impart curvature to the opposite end portions of strips 28e, 28f, causing them to engage the opposing rolls. In a modification of this embodiment, the two strips 28e, 28f could be replaced by a single strip, of the type shown in FIGS. 4 and 5, whose opposite ends are secured in slots 46e, 46f rather than to pin 44 or post 36.

The invention has been described in detail with particular reference to its preferred and alternative embodiments illustrated herein. It will be understood, however, that further variations and modifications can be effected within the spirit and scope of this invention.

I claim:

1. In a tape cassette having a support wall with a pair of spaced-apart hubs rotatably mounted thereon and a length of tape having opposite ends connected respectively to said hubs with a portion thereof intermediate said ends wound around said hubs to form a corresponding pair of tape rolls whose diameters change inversely as said tape is unwound from one and wound onto the other of said rolls, said rolls having respective outer tape windings with recording surfaces thereon facing each other, an improvement comprising a V-shaped, non-continuous resilient strip having a central portion thereof secured to said support wall with elongate opposite end portions thereof projecting between said outer tape windings and respectively contacting said outer winding facing surfaces, said resilient strip including a backing layer of resilient material and a front layer of cleaning material on said end portions facing said outer winding surfaces for continuously cleaning said surfaces as said tape is unwound from the one and wound onto the other of said rolls.

* * * * *